(12) United States Patent
Yamada

(10) Patent No.: US 9,251,195 B2
(45) Date of Patent: Feb. 2, 2016

(54) METHOD OF MANAGING DATABASE

(75) Inventor: Hiroyuki Yamada, Tokyo (JP)

(73) Assignee: MURAKUMO CORPORATION, Tokyo (JP)

(*) Notice: Subject to any disclaimer, the term of this patent is extended or adjusted under 35 U.S.C. 154(b) by 722 days.

(21) Appl. No.: 13/542,324

(22) Filed: Jul. 5, 2012

(65) Prior Publication Data

US 2013/0013556 A1 Jan. 10, 2013

(30) Foreign Application Priority Data

| Jan. 20, 2012 | (JP) | 2012-010434 |
| Jan. 26, 2012 | (JP) | 2012-013837 |
| Jan. 26, 2012 | (JP) | 2012-013838 |
| Jan. 26, 2012 | (JP) | 2013-013839 |

(51) Int. Cl.
*G06F 17/30* (2006.01)
*G06F 15/16* (2006.01)

(52) U.S. Cl.
CPC .......... *G06F 17/30353* (2013.01); *G06F 15/16* (2013.01)

(58) Field of Classification Search
USPC ........................................................ 707/649
See application file for complete search history.

(56) References Cited

U.S. PATENT DOCUMENTS

| 5,432,926 A | 7/1995 | Citron et al. |
| 5,687,363 A | 11/1997 | Oulid-Aissa et al. |
| 5,721,909 A | 2/1998 | Oulid-Aissa et al. |
| 5,764,977 A | 6/1998 | Oulid-Aissa et al. |
| 5,835,757 A | 11/1998 | Oulid-Aissa et al. |
| 2006/0155945 A1* | 7/2006 | McGarvey .................... 711/162 |
| 2007/0104123 A1* | 5/2007 | Tomici et al. ................. 370/310 |
| 2012/0011098 A1 | 1/2012 | Yamada |

FOREIGN PATENT DOCUMENTS

| JP | 6-215032 A | 8/1994 |
| JP | 8-55048 A | 2/1996 |
| JP | 2001-319012 A | 11/2001 |
| JP | 2006-293910 A | 10/2006 |
| JP | 2009-230404 A | 10/2009 |
| JP | 2010-218159 A | 9/2010 |
| WO | 2010/106991 A1 | 9/2010 |

OTHER PUBLICATIONS

Extended European Search Report dated Nov. 9, 2012, issued in corresponding European Patent Application No. 12175043.4.

* cited by examiner

*Primary Examiner* — Hosain Alam
*Assistant Examiner* — Tuan-Khanh Phan
(74) *Attorney, Agent, or Firm* — Westerman, Hattori, Daniels & Adrian, LLP

(57) ABSTRACT

A multi-master node model database management technology involves notifying a higher-level master node of a transaction minimum value as a minimum value of an implementation-underway transaction in a snapshot from a lower-level master node, comparing the transaction minimum value with minimum values retained by the respective master nodes and thus updating a node minimum value and a cluster minimum value. Then, the lower-level master node transmits a write set containing a shadow copy of its own database, a heap tuple map deployed on its own memory and the transaction minimum value to the higher-level master node, and the higher-level master node receiving the write set updates the database by use of the write set if the transaction minimum value is equal to or larger than the cluster minimum value, and aborts the write set if the transaction minimum value is smaller than the cluster minimum value.

9 Claims, 9 Drawing Sheets

| XB1 | D14 | U157 | XC1 | Omin6 | |

FIG.5

METHOD OF MANAGING DATABASE

CROSS-REFERENCE TO RELATED APPLICATIONS

This application is based upon and claims the benefit of priority of the prior International Application PCT/JP2011/065353, filed on Jul. 5, 2011, the prior Japanese Patent Application No. JP 2012-010434, filed on Jan. 20, 2012, the prior Japanese Patent Application No. JP 2012-013837, filed on Jan. 26, 2012, the prior Japanese Patent Application No. JP 2012-013838, filed on Jan. 26, 2012, and the prior Japanese Patent Application No. JP 2012-013839, filed on Jan. 26, 2012, the entire contents of which are incorporated herein by reference.

FIELD

The present invention relates generally to a method of managing a database, and particularly to a method of managing a database in which a plurality of master nodes is hierarchically connected via a network.

BACKGROUND

In even a recordable database such as PostgreSQL, it is desirable to completely erase (VACUUM) a tuple (row) with an elapse of a predetermined period of time after deleting the tuple in order to effectively utilize resources.

A transaction is, however, managed with a single snapshot from a start (BEGIN) to an end (COMMIT or ROLLBACK) of implementation, and hence, even when a specified tuple is deleted during a certain transaction, this does not necessarily mean that none of the reference to this tuple is promptly made from within all the transactions. Therefore, a principle is that the tuple is not completely erased unless a series of transactions during which to make reference to the tuple are all committed (COMMIT). Even if the tuple is deleted, it is to be contrived that the reference to this tuple can be made on other implementation-underway snapshots at that point of time.

PostgreSQL therefore adopts a mechanism for determining where is delimited for the complete deletion (VACUUM) while referring to transaction IDs of the transactions that have already been committed as viewed from the snapshots of the respective transactions by use of the transaction ID attached to each transaction. Namely, it is because of an operation of calculating respective minimum values in the transaction IDs of the transactions deemed to be the implementation-underway transactions in the snapshots of the respective transactions and performing the complete deletion in accordance with the transaction ID having the smallest of the minimum values.

[Patent document 1] Japanese Patent Application Laid-Open Publication No. 2006-293910

SUMMARY

The operation described above is an operation for the database of a single node architecture, however, if this operation is applied to multi-master nodes, the present inventor found that the following problems arose, which could not be even predicted in the single-node system.

To be specific, the multi-master node system has a configuration including a tremendous number of nodes that are hierarchically built up, and has a massive amount of transactions that are simultaneously implemented in parallel on these nodes. Therefore, if there are variations in terms of throughputs between the nodes, it may follow that a processing delay of the single node affects the throughputs of the whole nodes.

Hence, in the case of the database of the multi-master node model, the value of the minimum value ID enabling the complete deletion to be done does not increase for any length of time, and consequently effectiveness of the complete deletion process on the nodes throughout cannot be ensured.

Such a method is therefore considered, as to execute the complete deletion process by forcibly setting the minimum value ID to a value of a certain size.

By the way, in this type of multi-master node model database, the present inventor proposed the technology (Japanese Patent Application No. JP 2011-534944) of unifying the update processes of the databases on the nodes throughout by transmitting a write set containing a shadow copy of the database of a lower-level master node and a heap tuple map deployed on its own memory to a higher-level master node in order to efficiently perform updating without any contradiction.

Incidentally, the lower-level master node generates and transmits the write set to the higher-level master node, during which if the higher-level master node transmits an instruction of completely deleting an update target tuple of the write set to the lower-level master node, there is a possibility that the higher-level master node receiving the write set afterward is to update the tuple, which will have already been completely deleted, on the basis of contents of the write set.

Therefore, the multi-master node model database also needs executing a process of discarding the transaction without losing consistency among the databases throughout.

Means for Solving the Problems

A first aspect of the present invention is a method of managing a recordable database including hierarchically higher-level and lower-level master nodes in which records can be updated, the method including: transmitting a write set containing a shadow copy of a database of a lower-level master node, a heap tuple map deployed on a memory of the lower-level master node itself and a transaction minimum value of a snapshot to which to make reference in an implementation-underway transaction to a higher-level master node in a session of any one of the lower-level master nodes; comparing a transaction minimum value in the write set received from the lower-level master node with a cluster minimum value retained by the higher-level master node, comparing a heap tuple map in the write set with a database of the higher-level master node itself if the transaction minimum value is equal to or larger than the cluster minimum value, verifying whether a database containing a tuple registered as a target is updated or not, aborting the write set when updated, updating its own database by use of the shadow copy when not updated, and generating this update record as a transaction log in the higher-level master node; aborting the write set if the transaction minimum value is smaller than the cluster minimum value; distributing the transaction log to the lower-level master nodes including the lower-level master node as the sender; updating the database of the lower-level master node itself on the basis of the received transaction log in the lower-level master node; and notifying the lower-level master nodes of the cluster minimum value retained by the higher-level master node and discarding the transaction having the transaction minimum value smaller than the cluster minimum value.

Further, a second aspect of the present invention is the method of managing the recordable database according to the first aspect, wherein the lower-level master node compares the transaction minimum values with each other between a plurality of snapshots in which the implementation-underway transactions are recorded in time-series, sets the smallest value as a node minimum value, and notifies the higher-level master node of this node minimum value as a tree minimum value, and the higher-level master node selectively determines and retains the cluster minimum value from the node minimum value of the higher-level master node itself and the tree minimum values of which one or two or more lower-level master nodes notified.

Still further, a third aspect of the present invention is the method of managing the recordable database according to the first aspect, wherein an intermediate-level master node is provided at a hierarchy between the higher-level master node and the lower-level master node, the lower-level master node compares the transaction minimum values with each other between the plurality of snapshots in which the implementation-underway transactions are recorded in time-series, sets the smallest value as the node minimum value, and notifies the intermediate-level master node of this node minimum value as a tree minimum value, the intermediate-level master node compares its own node minimum value with the tree minimum values of which one or two or more lower-level master nodes notified, and notifies the higher-level master node of the smallest value as the tree minimum value of the intermediate-level master node, and the higher-level master node selectively determines and retains the cluster minimum value from the node minimum value of the higher-level master node itself and the tree minimum values of which one or two or more intermediate-level master nodes notified.

Yet further, a fourth aspect of the present invention is the method of managing the recordable database according to the third aspect, wherein the intermediate-level master node further has a tree structure of 2 or more hierarchies.

Yet further, a fifth aspect of the present invention is the method of managing the recordable database according to the first aspect, wherein the lower-level master node is notified of the cluster minimum value retained by the higher-level master node asynchronously with notifying the lower-level master node of the transaction log.

According to this method, the lower-level master node is notified of the cluster minimum value asynchronously with a replication management process, thereby making it possible to execute the efficient discarding process related to the transaction ID.

Moreover, a sixth aspect of the present invention is the method of managing the recordable database according to the first aspect, wherein the lower-level master node is notified of the cluster minimum value retained by the higher-level master node in such a way that the transaction log contains the cluster minimum value.

According to this method, a notification sequence can be made compulsory by causing the replication management process to contain the cluster minimum value, and hence the transaction ID can be discarded without any contradiction.

Further, a seventh aspect of the present invention is the method of managing the recordable database according to the third or fourth aspect, wherein the write set is generated in the intermediate-level master node in place of the lower-level master node, and at least the transaction minimum value of the snapshot to which to make reference in the implementation-underway transaction in the intermediate-level master node is written to the write set.

An eighth aspect of the present invention is a recordable database management method of a higher-level master node in a recordable database including hierarchically higher-level and lower-level master nodes in which records can be updated, the method including: transmitting a write set containing a shadow copy of a database of a lower-level master node, a heap tuple map deployed on a memory of the lower-level master node and a transaction minimum value of a snapshot to which to make reference in an implementation-underway transaction to the higher-level master node in a session of any one of the lower-level master nodes; comparing the transaction minimum value in the received write set with a cluster minimum value retained by the higher-level master node, comparing the heap tuple map in the write set with its own database if the transaction minimum value is equal to or larger than the cluster minimum value, verifying whether a database containing a tuple registered as a target is updated or not, aborting the write set when updated, and updating its own database by use of the shadow copy when not updated; aborting the write set if the transaction minimum value is smaller than the cluster minimum value; and notifying the lower-level master nodes of the cluster minimum value retained by the higher-level master node and discarding the transaction having the transaction minimum value smaller than the cluster minimum value.

A ninth aspect of the present invention is a recordable database management method of a lower-level master node in a recordable database including hierarchically higher-level and lower-level master nodes in which records can be updated, when a database update instruction occurs on any one of the lower-level master nodes and on such an occasion that a database processing unit of the lower-level master node generates a write set containing a shadow copy of a database deployed on its own memory, a heap tuple map and a transaction minimum value of a snapshot to which to make reference in an implementation-underway transaction for the higher-level master node, the method including: comparing, for the higher-level master node receiving the write set on this occasion, the transaction minimum value in the write set received from the lower-level master node with the cluster minimum value retained by the higher-level master node, updating the database of the higher-level master node by use of the shadow copy if the transaction minimum value is equal to or larger than the cluster minimum value, generating this update record as a transaction log, and transmitting the write set to the higher-level master node in order for the lower-level master nodes including the lower-level master node as the sender to distribute the transaction log; making a transaction log processing unit of the lower-level master node update its own database on the basis of the transaction log when receiving the transaction log; and discarding the transaction having the transaction minimum value smaller than the cluster minimum value by receiving the cluster minimum value retained by the higher-level master node in the lower-level master node.

A tenth aspect of the present invention is the recordable database management method according to eighth or ninth aspect, wherein the lower-level master node compares the transaction minimum values with each other between a plurality of snapshots in which the implementation-underway transactions are recorded in time-series, sets the smallest value as a node minimum value, and notifies the higher-level master node of this node minimum value as a tree minimum value, and the higher-level master node selectively determines and retains the cluster minimum value from the node minimum value of the higher-level master node itself and the tree minimum values of which one or two or more lower-level master nodes notified.

An eleventh aspect of the present invention is the recordable database management method according to the eighth or ninth aspect, wherein an intermediate-level master node is provided at a hierarchy between the higher-level master node and the lower-level master node, the lower-level master node compares the transaction minimum values with each other between the plurality of snapshots in which the implementation-underway transactions are recorded in time-series, sets the smallest value as the node minimum value, and notifies the intermediate-level master node of this node minimum value as a tree minimum value, the intermediate-level master node compares its own node minimum value with the tree minimum values of which one or two or more lower-level master nodes notified, and notifies the higher-level master node of the smallest value as the tree minimum value of the intermediate-level master node, and the higher-level master node selectively determines and retains the cluster minimum value from the node minimum value of the higher-level master node itself and the tree minimum values of which one or two or more intermediate-level master nodes notified.

A twelfth aspect of the present invention is the recordable database management method according to the eleventh aspect, wherein the intermediate-level master node further has a tree structure of 2 or more hierarchies.

A thirteenth aspect of the present invention is the recordable database management method according to the eighth aspect, wherein the lower-level master node is notified of the cluster minimum value retained by the higher-level master node asynchronously with notifying the lower-level master node of the transaction log.

A fourteenth aspect of the present invention is the recordable database management method according to the eighth aspect, wherein the lower-level master node is notified of the cluster minimum value retained by the higher-level master node in such a way that the transaction log contains the cluster minimum value.

A fifteenth aspect of the present invention is the recordable database management method according to the eleventh or twelfth aspect, wherein the write set is generated in the intermediate-level master node in place of the lower-level master node, and at least the transaction minimum value of the snapshot to which to make reference in the implementation-underway transaction in the intermediate-level master node is written to the write set.

A sixteenth aspect of the present invention is a method of managing a recordable database including hierarchically a higher-level master node and one or two or more lower-level master nodes in which records can be updated, the method including: comparing mutually transaction minimum values of snapshots to which to make reference in implementation-underway transactions and transmitting a node minimum value defined as the smallest value to the higher-level master node in the respective lower-level master nodes; making the higher-level master node receiving the node minimum value from each of the lower-level master nodes read its own node minimum value, compare the readout node minimum value with the received node minimum value, and determine and update a cluster minimum value retained by the higher-level master node itself within a range of the respective node minimum values; and notifying each lower-level master node of the cluster minimum value updated by the higher-level master node and discarding the transactions each having the transaction minimum value smaller than the cluster minimum value.

A seventeenth aspect of the present invention is the method of managing the recordable database including hierarchically the master nodes according to the sixteenth aspect, wherein a hierarchical structure has two hierarchies including the higher-level master node and the lower-level master nodes.

An eighteenth aspect of the present invention is the method of managing the recordable database according to the sixteenth aspect, wherein a hierarchical structure has at least three or more hierarchies including the higher-level master node, the intermediate-level master nodes of one or more hierarchies and the lower-level master nodes, the intermediate-level master node also executes transmitting its own node minimum value to the higher-level master node, and the higher-level master node executes receiving the node minimum values from the respective lower-level master nodes and the intermediate-level master node, reading its own node minimum value, comparing the readout node minimum value with the received node minimum values, and determining and updating the cluster minimum value retained by the higher-level master node within a range of these node minimum values.

A nineteenth aspect of the present invention is a method of managing a recordable database including hierarchically higher-level and lower-level master nodes in which records can be updated, the method including: transmitting a write set containing a shadow copy of a database of a lower-level master node, a heap tuple map deployed on a memory of the lower-level master node itself, a transaction minimum value of a snapshot to which to make reference in an implementation-underway transaction and a node minimum value defined as the smallest value obtained by comparing the transaction minimum values with each other in the nodes to a higher-level master node in a session of any one of the lower-level master nodes; comparing the node minimum values read from each write set with the node minimum value retained by the higher-level master node itself, and determining and updating the cluster minimum value retained by the higher-level master node with a value in the range of these node minimum values in the higher-level master node; comparing a transaction minimum value in the write set received from the lower-level master node with a cluster minimum value retained by the higher-level master node, comparing a heap tuple map in the write set with a database of the higher-level master node itself if the transaction minimum value is equal to or larger than the cluster minimum value, verifying whether a database containing a tuple registered as a target is updated or not, aborting the write set when updated, updating its own database by use of the shadow copy when not updated, and generating this update record as a transaction log in the higher-level master node; aborting the write set if the transaction minimum value is smaller than the cluster minimum value; distributing the transaction log to the lower-level master nodes including the lower-level master node as the sender; updating the database of the lower-level master node itself on the basis of the received transaction log in the lower-level master node; and notifying the lower-level master nodes of the cluster minimum value retained by the higher-level master node and discarding the transaction having the transaction minimum value smaller than the cluster minimum value.

A twentieth aspect of the present invention is the method of managing the recordable database including hierarchically the master nodes according to the nineteenth aspect, wherein the intermediate-level master nodes of one or more hierarchies are provided between the higher-level master node and the lower-level master nodes, and the write set is transmitted to the higher-level master node in the session of any one of the intermediate-level master nodes, the write set containing the shadow copy of the database on the intermediate-level master node, the heap tuple map deployed on its own memory, the transaction minimum value of the snapshot to which to make reference in the implementation-underway transaction and the node minimum value defined as the smallest value obtained by comparing mutually the transaction minimum values in the nodes.

A twenty first aspect of the present invention is a method of managing a recordable database including hierarchically higher-level and lower-level master nodes in which records can be updated, the method including: transmitting lower-level database update information containing a transaction minimum value of a snapshot to which to make reference in an implementation-underway transaction to the higher-level master node in a session of any one of the lower-level master nodes; comparing, in the higher-level master node receiving the lower-level database update information, the transaction minimum value with a cluster minimum value retained by the higher-level master node, and updating the database of the higher-level master node on the basis of the lower-level database update information if the transaction minimum value is equal to or larger than the cluster minimum value; aborting the lower-level database update information if the transaction minimum value is smaller than the cluster minimum value; generating an update record of the higher-level master node as a transaction log; distributing the transaction log to the lower-level master nodes including the lower-level master node as the sender; updating the database of the lower-level master node itself on the basis of the received transaction login the lower-level master node; and notifying the lower-level master nodes of the cluster minimum value retained by the higher-level master node and discarding the transaction having the transaction minimum value smaller than the cluster minimum value.

A twenty second aspect of the present invention is the method of managing the recordable database according to the twenty first aspect, wherein the lower-level database update information is a write set containing a shadow copy of a database of the lower-level master node, a heap tuple map deployed on its own memory, and a transaction minimum value of the snapshot to which to make reference in the implementation-underway transaction, the method further including: comparing the transaction minimum value with the cluster minimum value retained by the higher-level master node when the higher-level master node receives the write set, comparing the heap tuple map in the write set with its own database if the transaction minimum value is equal to or larger than the cluster minimum value, verifying whether a database containing a tuple registered as a target is updated or not, aborting the write set when updated, and updating its own database by use of the shadow copy when not updated, and aborting the write set if the transaction minimum value is smaller than the cluster minimum value.

According to a twenty third aspect of the present invention is the method of managing the recordable database according to the twenty second aspect, wherein the intermediate-level master nodes of one or more hierarchies are provided, in addition to the configuration given above, between the higher-level master node and the lower-level master nodes, the method further including: transmitting intermediate-level database update information containing the transaction minimum value, which becomes an update target of the database of the intermediate-level master node for the higher-level master node, to the higher-level master node in a session of any one of the intermediate-level master nodes; and comparing, in the higher-level master node receiving the intermediate-level database update information, the transaction minimum value with the cluster minimum value retained by the higher-level master node, and updating the database of the higher-level master node on the basis of the intermediate-level database update information if the transaction minimum value is equal to or larger than the cluster minimum value.

It is to be noted that other aspects of each embodiment of the present invention may be an information processing device which realizes the respective configurations described above, may also be an information processing system, may further be a program and may still further be a non-transitory recording medium, on which such a program is recorded, readable by a computer, other devices and machines. Herein, the recording medium readable by the computer etc connotes a medium that accumulates information such as programs electrically, magnetically, optically, mechanically or by chemical action. Further, the information processing system may also be realized by a single or a plurality of information processing devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

According to the present invention, in the multi-master node model database also, the complete erase (VACUUM) of the whole tree can be realized at a much larger minimum ID level without losing the consistency among the databases throughout.

BRIEF DESCRIPTION OF DRAWINGS

FIG. 5 is an explanatory diagram illustrating a structure of transaction log data.

DESCRIPTION OF EMBODIMENT

Embodiments of the present invention will hereinafter be described with reference to the drawings.

Working Examples

Figure 1:
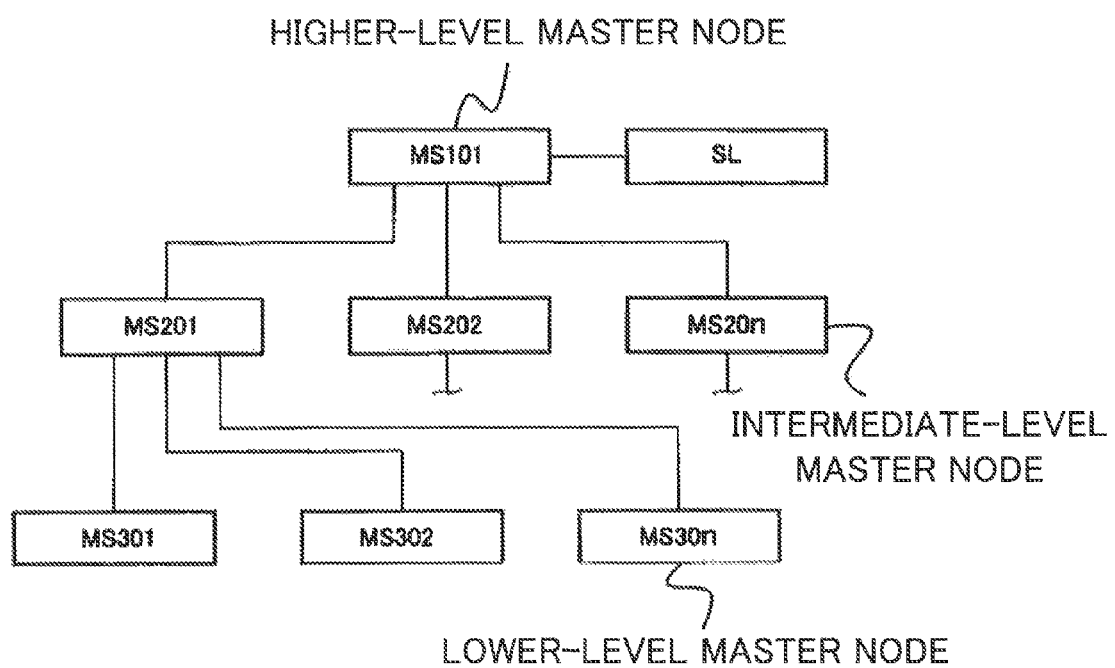
FIG. 1 is an explanatory diagram illustrating a structure of a multi-master node model database according to the invention of the present application.

FIG. 1 depicts a hierarchical structure of master nodes in the present embodiment. As depicted in FIG. 1, the node configuration is that intermediate-level master nodes (MS201, MS202 . . . MS20$n$) and lower-level master nodes (MS301, MS302 . . . MS30$n$) exist hierarchically under a higher-level master node (MS101). Each node (an information processing device) includes a database. Further, the higher-level master node (MS101) has slaves, however, other lower-level master nodes may also have their slaves. In the case of this type of master-slave architecture, an update management technology disclosed in PCT/JP2010/054311 (which is the prior patent application filed by the present applicant) filed by the present applicant can be applied to an update of a database between the master and the slave.

Figure 2:
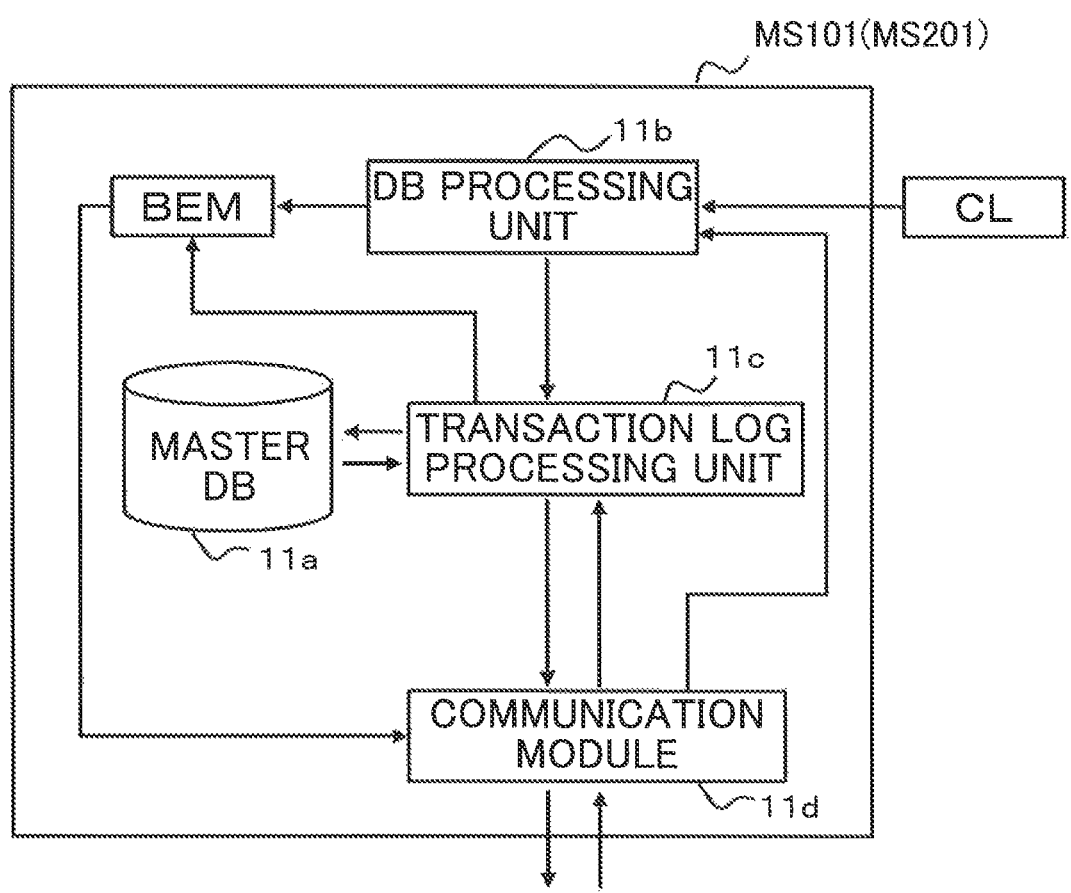
FIG. 2 is a block diagram illustrating a configuration of a database control unit.
Figure 4:
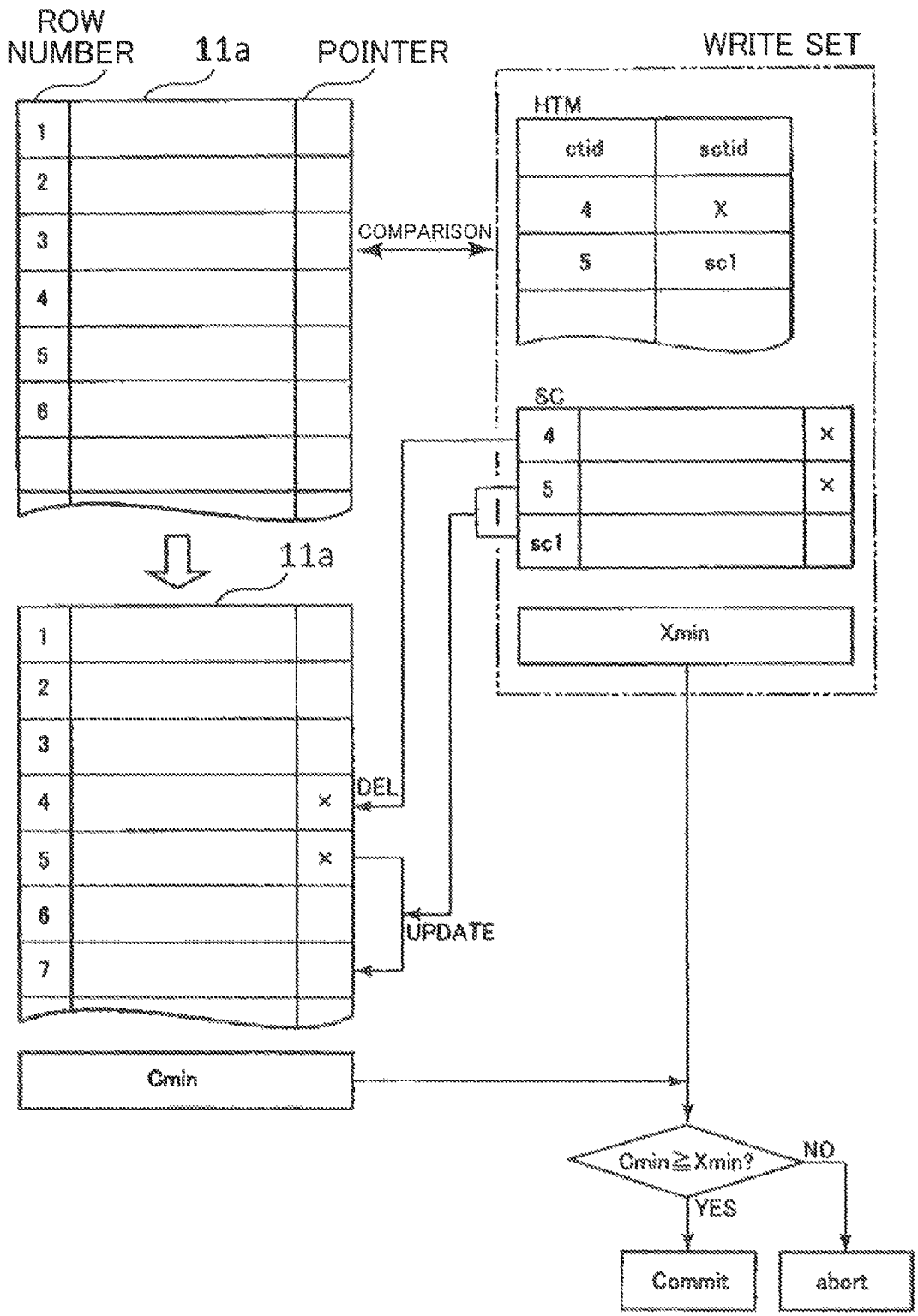
FIG. 4 is an explanatory diagram illustrating a process of the write set in a higher-level master node.

FIG. 2 is a functional block diagram of the lower-level master node (MS201), however, the higher-level master node (MS101) also has similar functions. As illustrated in FIG. 2, when an instruction to update the database is inputted from a client (CL), a database processing unit (11*b*) generates a write set representing lower-level database update information on a backend memory (BEM) built on a memory (MM). This write set is, as depicted in FIG. 4, an assembly of a heap tuple map (HTM), a shadow copy (SC) and a transaction minimum value (Xmin). Herein, an assumption is that there is inputted an update instruction of deleting (DELETE) a row number 4 of a master database (101*a*) and rewriting (UPDATE) a row number 5 into a new value (sc1).

At this time, the database processing unit (11*b*) does not perform direct writing to the master database (11*a*) while referring to the master database (11*a*) but transmits the write set generated on the backend memory (BEM) to the higher-level master node through a communication module (11*d*). The kind of processing is performed in the higher-level master node (MS101), as well as in the lower-level master nodes (MS201, MS202 . . . MS20*n* and MS301, MS302 . . . MS30*n*). The higher-level master node (MS101) is a general purpose information processing apparatus, and includes a large-scale hard drive (HD), a master database (11*a*), and a communication interface (I/O) (communication module 11*d*) for communicating with the outside which are connected via a bus (BUS) around a central processing unit (CPU) and a main memory (MM). Note that a client terminal (CL) is connected via the bus (BUS) or the communication interface (I/O) for receiving instructions. The large-scale hard drive (HD) stores an operating system (OS) as well as application programs (APL), and the functions as the foregoing master node are realized by the central processing unit (CPU) reading and sequentially executing the programs via the bus (BUS) and the main memory (MM). Note that, although the explanation is omitted, the lower-level master nodes (MS201, MS202, . . . , MS20*n* and MS301, MS302, . . . , MS30*n*) are also configured the same.

Figure 8:
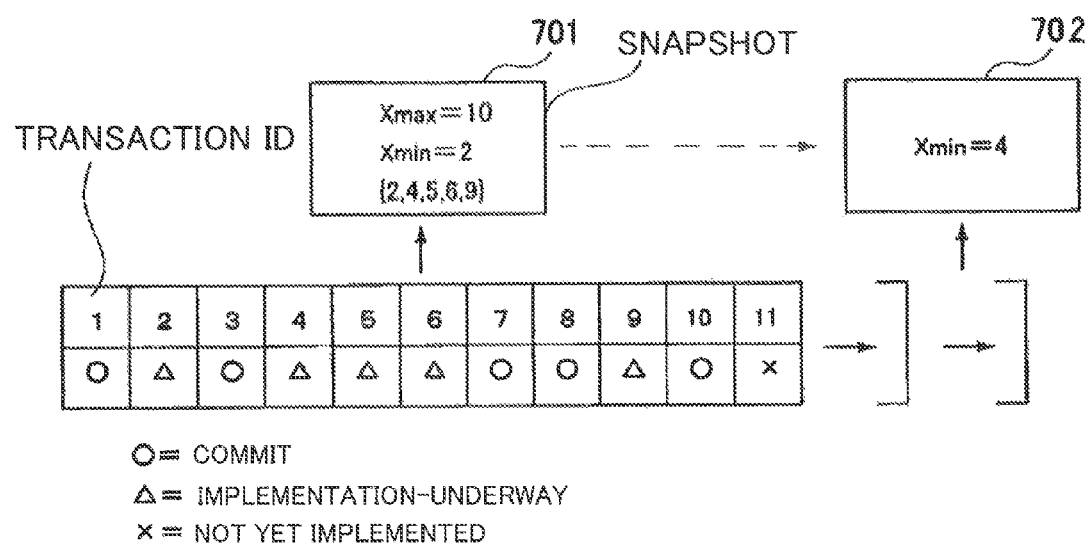
FIG. 8 is a diagram illustrating contents of a snapshot.

FIG. 8 illustrates a relation between a transaction and a snapshot in each node (the higher-level master node, the intermediate-level master node or the lower-level master node). Each node implements a plurality of transactions in parallel and retains a plurality of snapshots indicating execution statuses of the transactions in time-series at each of plural points of time.

In FIG. 8, on this node, implementations of transactions having transaction IDs=2, 4, 5, 6 and 9 are underway. Further, transactions having transaction IDs=1, 3, 7, 8 and 10 are committed. Moreover, a transaction having a transaction ID=11 is not yet implemented. The snapshot at this point of time undergoes recording of a maximum value of an implementation-underway transaction or a committed transaction as a transaction maximum value (which is herein given by Xmax=10) and a minimum value of the implementation-underway transaction as a transaction minimum value (which is herein given by Xmin=2).

A contrivance is that the snapshots such as these are recorded on the backend memory (BEM). The smallest value in the plurality of transaction minimum values among these snapshots becomes a node minimum value. In FIG. 8, the transaction minimum value of a snapshot 701 is 2 (Xmin=2), the transaction minimum value of a snapshot 702 is 4 (Xmin=4), and therefore the node minimum value becomes 2 (Nmin=2). Note that if the lower-level master node has no further lower-level nodes, this node minimum value 2 (Nmin=2) becomes a tree minimum value (Tmin=2).

The intermediate-level master node (e.g., MS201) is notified of the node minimum value (Nmin), i.e., the tree minimum value (Tmin), generated by the lower-level master node (e.g., MS301) on demand asynchronously with the write set that will be described later on. This intermediate-level master node (MS201) compares the tree minimum value (Tmin) received from each of the lower-level master nodes (MS301-MS30*n*) with the node minimum value (Nmin) in the snapshots of the intermediate-level master node itself, and thus updates its own tree minimum value (Tmin) with the smaller value.

Next, the higher-level master node (MS101) is notified of the tree minimum value (Tmin) of each of the intermediate-level master nodes (MS201-MS20*n*). The higher-level master node (MS101), when receiving the tree minimum value (Tmin) received from each of the intermediate-level master nodes (MS201-MS20*n*), compares the received tree minimum value (Tmin) with the node minimum value (Nmin) in its own snapshots, and thus updates the tree minimum value (Tmin) of the higher-level master node itself by adopting any one of the minimum values or a value between these minimum values. Then, this tree minimum value (Tmin) is compared with a cluster minimum value (Cmin) at that point of time, and a new cluster minimum value (Cmin) is determined and updated by taking a value therebetween.

Figure 6:
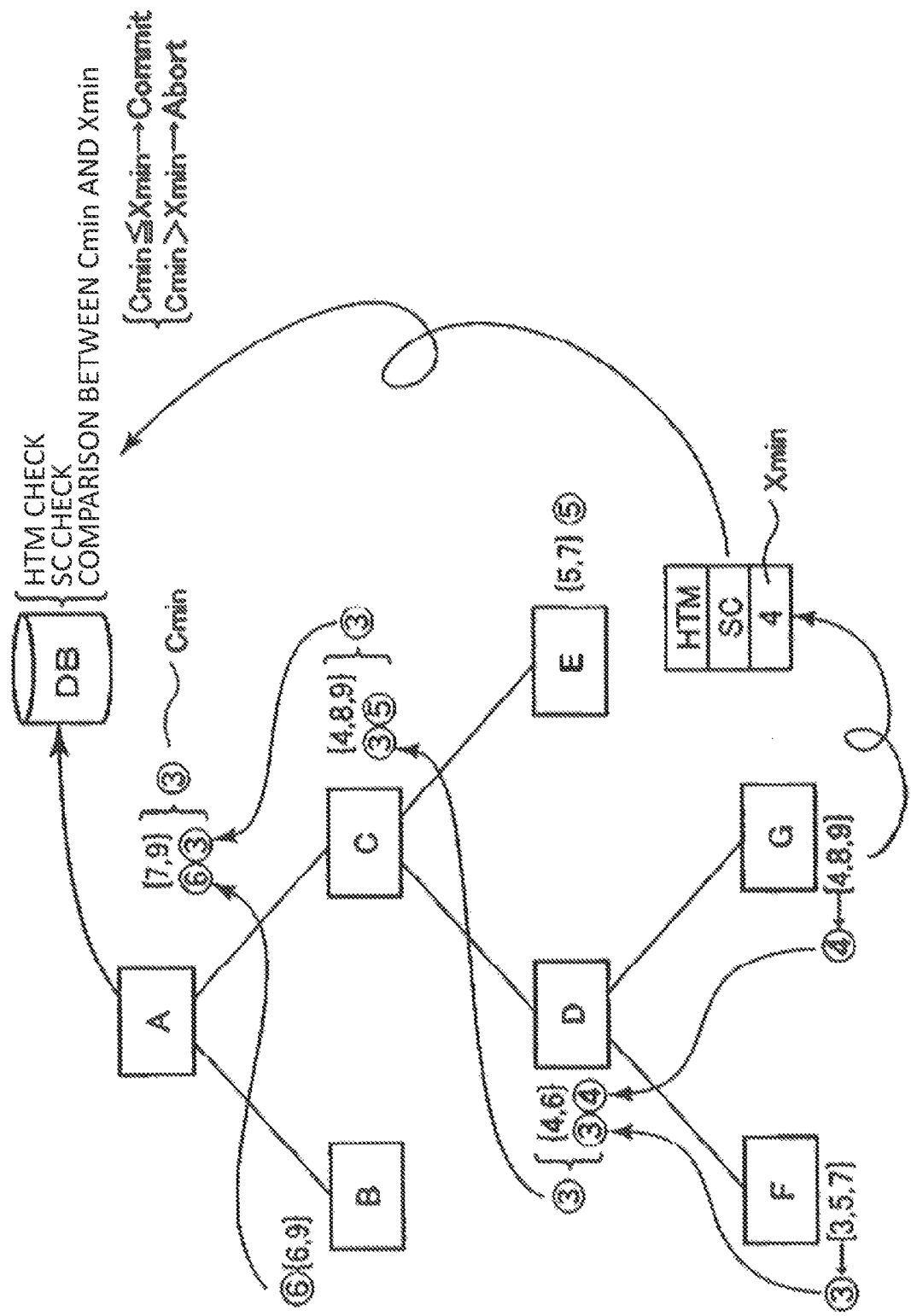
FIG. 6 is a diagram illustrating a tree structure of the multi-master node model database and a relation between a transaction minimum value, a tree minimum value and a node minimum value.

Described next by use of FIG. 6 is a status of how the node minimum values (Nmin), i.e., the tree minimum values (Tmin) of the lower-level master nodes E and F, the tree minimum values (Tmin) of the intermediate-level master nodes B, C, D and E, the tree minimum value (Tmin) of the higher-level master node A and the cluster minimum value (Cmin) are updated.

Herein, if the node minimum value (Nmin) of the lower-level master node F is "3" as a result of comparing the transaction minimum values (Xmin) of the lower-level master node F with each other and the node minimum value (Nmin) of the lower-level master node G is "4" as a result of comparing the transaction minimum values (Xmin) of the lower-level master node G with each other, these node minimum values (Nmin) become their tree minimum values (Tmin) because of the lower-level master nodes F and G having no further subordinate hierarchies.

The intermediate-level master node D is notified of each of these tree minimum values (Tmin=3, Tmin=4). The intermediate-level master node D retains "4" as the node minimum value, and, as a result of the comparison therebetween, the smallest value (which is herein "3") is set as the tree minimum value (Tmin=3) of the intermediate-level master node D.

On the other hand, the intermediate-level master node E retains "5" as the node minimum value (Nmin) but does not have any subordinate master nodes, and hence the node minimum value (Nmin=5) is set as the tree minimum value (Tmin=5).

The intermediate-level master node C receives the tree minimum value (Tmin=3) from the intermediate-level master node D and the tree minimum value (Tmin=5) from the intermediate-level master node E. On the other hand, the intermediate-level master node C retains "4" as its own node minimum value (Nmin), and updates its own tree minimum value such as (Tmin=3) by use of the smallest value "3" given as a result of the comparison therebetween. Then, the higher-level master node A is notified of this tree minimum value.

On the other hand, in FIG. 6, there exists the intermediate-level master node B in parallel with the intermediate-level master node C, however, this intermediate-level master node B has none of the master nodes at the subordinate hierarchy, so that the higher-level master node A is notified of its own node minimum value (Nmin=6) intact as the tree minimum value (Tmin=6).

The higher-level master node A receives the tree minimum value (Tmin=6) from the intermediate-level master node B and the tree minimum value (Tmin=3) from the intermediate-level master node C, then compares its own node minimum value (Nmin=7) with these tree minimum values, and updates the tree minimum value such as (Tmin=3) in the higher-level master node A itself by use of the smallest value among these values.

Then, the master node A sets a numeric value between its own node minimum value (Nmin=7) and the updated tree minimum value (Tmin=3) as the cluster minimum value (Cmin).

A criterion for determining the cluster minimum value (Cmin) at this time is that if the cluster minimum value is set to a smaller value (e.g., Cmin=3), the transaction minimum value on the snapshots of all the nodes becomes equal to or larger than "3", consequently such a probability decreases that the write sets generated on the lower-level and intermediate-level master nodes are to be aborted when reaching the higher-level master node, and the loads on the respective nodes are reduced as the futile write sets are decremented. While on the other hand, a benchmark for complete erase (VACUUM) takes a small value, and it is therefore hard to perform an efficient operation based on the complete erase in the whole nodes.

Reversely to this case, if the cluster minimum value (Cmin) takes a much larger value (e.g., Cmin=7), though the efficiency of the complete erase is improved, there rises the probability that the write sets generated on the intermediate-level and lower-level master nodes are to be aborted when reaching the higher-level master node, and the loads on the write sets on the intermediate-level and lower-level master nodes augment.

As a method of setting the cluster minimum value (Cmin) such as this, a specified differential value between the node minimum value (Nmin) and the tree minimum value (Tmin) is determined beforehand, and, if over this specified differential value, the cluster minimum value may also be controlled as a benchmark value so as to fall forcibly within the specified difference.

When the cluster minimum value (Cmin) is thus set, the tuple is completely erased based on this cluster minimum value (Cmin). Namely, it is feasible to erase completely the tuple deleted by the transaction having the transaction ID smaller than the cluster minimum value (Cmin) in the higher-level master node. Then, it follows that the tuple, which is completely erased in the higher-level master node, can be safely completely erased also in the intermediate-level and lower-level master nodes by discarding the transactions that will be described as below and by the process of aborting the write sets.

Note that the discussion given so far has been made by taking the example in which the intermediate-level master nodes B-E or the lower-level master nodes F and G compare the node minimum values (Nmin) with each other to update the tree minimum value, and the higher-level master node A is notified of the updated tree minimum value, however, without being limited this example, the intermediate-level master nodes B-E or the lower-level master nodes F and G may also directly notify the higher-level master node A of their own node minimum values (Nmin). The higher-level master node A compares the thus-notified node minimum values (Nmin) with the node minimum value (Nmin) retained by the node A itself, then determines a new value within a range of these values and can thus update the cluster minimum value (Cmin) with this determined new value.

Figure 9:
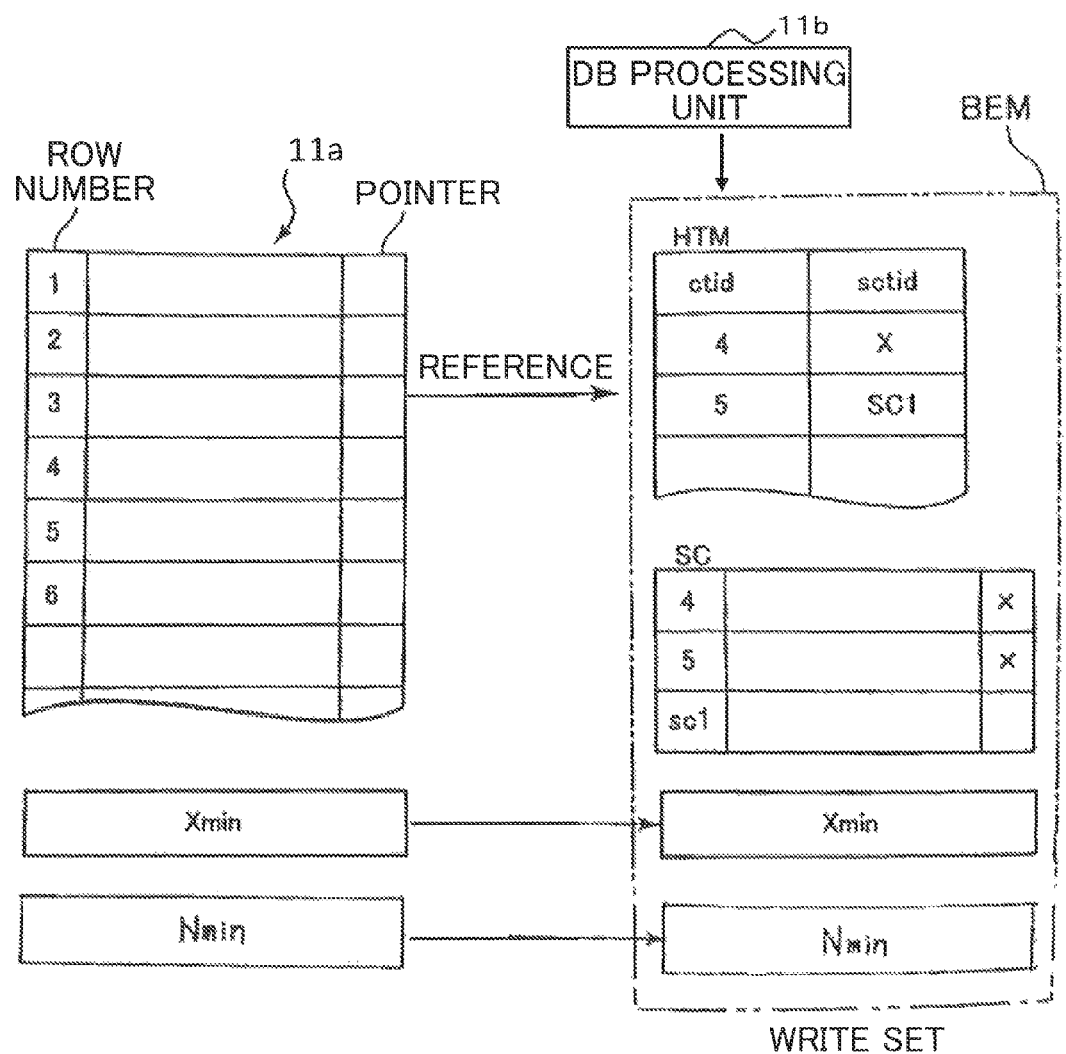
FIG. 9 is a diagram illustrating a modified example of the write set.

Thus, the respective intermediate-level and lower-level master nodes B-G directly notify the higher-level master node A of their own node minimum values (Nmin), thereby enabling a notification system to be simplified with no necessity for more complicated processes than by the method of notifying the higher-level master node A of the tree minimum value (Tmin) while updating the tree minimum value at each hierarchy. Moreover, when each of the intermediate-level master nodes B-E or the lower-level master nodes F and G generates the write set, the node minimum value (Nmin) may be registered in the write set together with the heap tuple map (HTM), the shadow copy (SC) and the transaction minimum value (Xmin) (see FIG. 9). Thus, the higher-level master node A is notified of the write set in which the node minimum value (Nmin) is registered, thereby enabling the system to be simplified because of the higher-level master node A having no necessity for another notification system other than the write set.

In this case, the higher-level master node A reads the node minimum values (Nmin) from the respective write sets directly transmitted from the intermediate-level master nodes B-E and the lower-level master nodes F and G, then compares these node minimum values (Nmin) with the node minimum value (Nmin) retained by the node A itself, determines a new value within a range of these values and may thus update the cluster minimum value (Cmin) with this determined new value.

After the higher-level master node A has updated the cluster minimum value (Cmin) as described above, the same processes as those stated above are executed. To be specific, the higher-level master node A compares the cluster minimum value (Cmin) retained by the higher-level master node A itself with the transaction minimum values (Xmin) in the write sets received from the intermediate-level master nodes B-E or the lower-level master nodes F and G, then makes verification as to whether the database of the tuples registered as the target tuples is updated or not by comparing the heap tuple map (HTM) in the write set with its own database if the transaction minimum value (Xmin) is equal to or larger than the cluster minimum value (Cmin), aborts the write set if updated, updates its own database by use of the shadow copy (SC) if not updated, and generates a transaction log of this update record. Whereas if the transaction minimum value (Xmin) is smaller than the cluster minimum value (Cmin), the higher-level master node A aborts the write set.

The intermediate-level master nodes B, C, D and E and the lower-level master nodes F and G are notified of the cluster minimum value (e.g., Cmin=6) that is set and updated by the higher-level master node A. Each of the nodes notified of this cluster minimum value (Cmin=6) discards (ROLLBACK) all the transactions during which to make reference to the snapshots having the transaction minimum values smaller than this value (Cmin=6). With this discard, each of the transaction minimum value (Xmin) in the individual node, the node minimum value (Nmin) and the tree minimum value (Tmin) based thereon invariably takes a value larger than "6". Accordingly, after the notification of the cluster minimum value (Cmin), the transaction during which to make reference to the completely-erased tuples come to non-existence.

Figure 7:
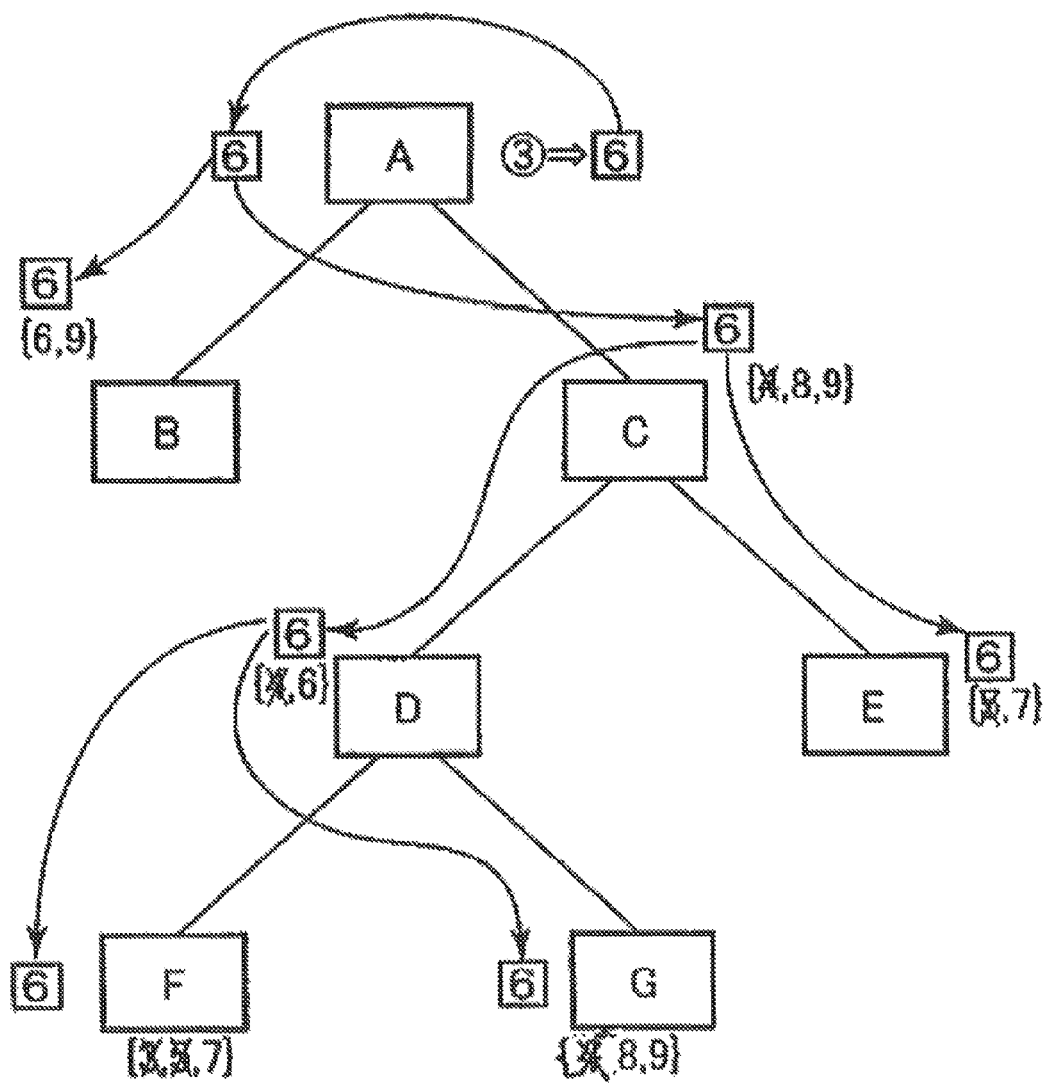
FIG. 7 is an explanatory diagram of updating a cluster minimum value and of a process of discarding a transaction by use of the cluster minimum value.

Note that the discussion in FIGS. 6 and 7 has dealt with the multi-master nodes having the 4-hierarchy tree structure built up by the higher-level master node A, the 2-hierarchy intermediate-level master nodes B, C, D and E and the lower-level master nodes F and G, however, another available tree structure is a totally 5- or more-hierarchy structure including a 2-hierarchy structure built up by the higher-level master node and the lower-level master nodes and a 3- or more-hierarchy structure built up by the intermediate-level master nodes.

Figure 3:
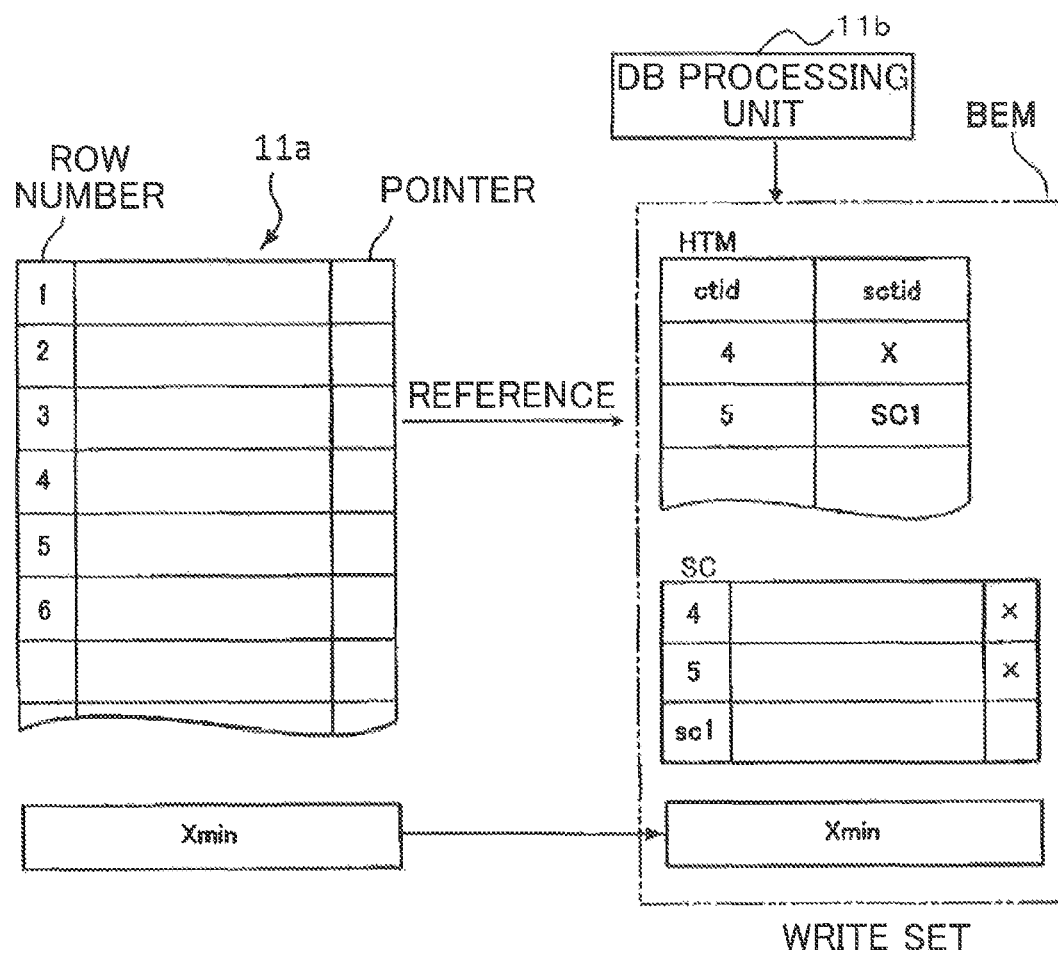
FIG. 3 is a diagram illustrating contents of a write set.

Next, the generation of the write set and the update using the write set will be described by use of FIG. 3. FIG. 3 illustrates a relation between a master database (11*a*) in the lower-level master node (M301 is given by way of one example) and the write set. The master database (11*a*) has a structure including a "row number" field, a "content of instruction" field and a "pointer" field and is defined as a recordable database in which the row number is added each time a new instruction is given from the client terminal (CL). FIG. 3, as explained earlier, depicts a case in which (a record of) a row number "4" is deleted (DELETE), while (a record of) a row number "5" is rewritten into a new content of instruction (UPDATED into sc1).

In the lower-level master node (MS301), the update instruction such as this is given to the master database in response to the instruction from the client terminal (CL), as described above, the write set including the heap tuple map (HTM, heap file), the shadow copy (SC) and the transaction minimum value (Xmin) is generated on the backend memory (BEM).

The heap tuple map (HTM) has registration of an original row number (ctid) and a new row number (sctid) in the way of being associated with each other. Thus, the heap tuple map (HTM) is additionally generated each time the database is updated. Note that a row number to which the content of instruction (sc1) of the row number "5" is written is still unknown at this stage, and therefore the new instruction (sc1) is to be written to "sctid".

On the other hand, shadow copies specified by the row number that should undergo rewriting with reference to the master database (11*a*) is generated in the shadow copy (SC). At this time, a newly added row number is unknown at this stage, and hence a new instruction (sc1) is written to the row number.

It is to be noted that the database processing unit (11*b*) of the lower-level master node (MS301) already recognizes at this stage that due to the generation of the heap tuple map (HTM), the row number "4" to which the DELETE instruction is applied and the old row number "5" to which the UPDATE instruction is applied are to be deleted, and therefore only the new instruction (sc1) may also be written as the shadow copy (SC).

Moreover, the transaction minimum value (Xmin) recorded on the snapshot to which the implementation-underway transaction refers as described above is written intact as the transaction minimum value (Xmin) added to the write set.

The thus-generated write set is transmitted to the intermediate-level master node (e.g., MS201) and further to the higher-level master node (MS101) from the lower-level master node (MS301).

In the higher-level master node (MS101), the database processing unit 11*b* (a central processing unit (CPU)) reads the transaction minimum value (Xmin) from the received write set. Then, the transaction minimum value (Xmin) is compared with the cluster minimum value (Cmin) retained on the backend memory (BEM) of the higher-level master node (MS101). At this time, when the transaction minimum value (Xmin) is equal to or larger than the cluster minimum value (Cmin), generation of the transaction log data is started by starting up the transaction log processing unit (11*c*), and thereafter the following processes are executed.

To begin with, the heap tuple map (HTM) is read out and compared with its own master database 11*a*. It is herein verified whether or not the contents of the target tuple (containing herein the row numbers "4" and "5") are updated on the database (11*a*). In FIG. 4, the contents of the row numbers "4"-"6" are not yet updated, and hence the DELETE pointer is attached to the row number "4", and the DELETE pointer is also attached to the old row number "5" (of which the content is) to be rewritten. Then, a new instruction (sc1) is written to a new row number "7".

The heap tuple map (HTM) in the write set given from the lower-level master node (M301) is compared with its own database, and, when the higher-level master node (MS101) has already updated the (content of) row with another write set, the process related to this write set is aborted (interrupted).

While on the other hand, the transaction minimum value (Xmin) in the write set is compared with the cluster minimum value (Cmin), and, when the transaction minimum value (Xmin) is smaller than the cluster minimum value (Cmin), the write set is aborted.

A reason why the write set is thus subjected to the abort process will hereinafter be elucidated. There is a possibility that the tuple deleted by the transaction having the transaction ID smaller than the cluster minimum value (Cmin) becomes the update target tuple in the write set. The tuple such as this has a high possibility of being already discarded based on the setting in the cluster minimum value (Cmin) of the higher-level master node. In that case, a matching property with this tuple cannot be detected by use of the heap tuple map, and consequently a contradiction occurs in the higher-level master node. It is, therefore, because such a contradiction is prevented from occurring by aborting the write set having the transaction minimum value (Xmin) smaller than the cluster minimum value (Cmin).

If the discard of the transaction involving the notification of the cluster minimum value (Cmin) is completed at the intermediate-level and lower-level master nodes, the write set such as this is not generated. The higher-level master node, however, notifies the lower-level master node of the cluster minimum value (Cmin), during which the write set generated at the intermediate-level and lower-level master nodes has a possibility of having the transaction minimum value (Xmin) smaller than the cluster minimum value (Cmin) and therefore needs to be checked by the higher-level master node when applied. This being the case, as stated above, a solution is that the transaction minimum value (Xmin) registered in the write set is compared with the cluster minimum value (Cmin), and, if the transaction minimum value (Xmin) is smaller than the cluster minimum value (Cmin), the write set is aborted.

Thus, with the notification of the cluster minimum value (Cmin), it is possible to discard all the transactions during which to refer to the completely erased tuples, and the write set generated by transposition to the cluster minimum value (Cmin) can be also aborted based on the cluster minimum value (Cmin). Accordingly, the tuples can be completely erased also at the intermediate-level and lower-level master nodes without spoiling the consistency of the database.

Figure 5:
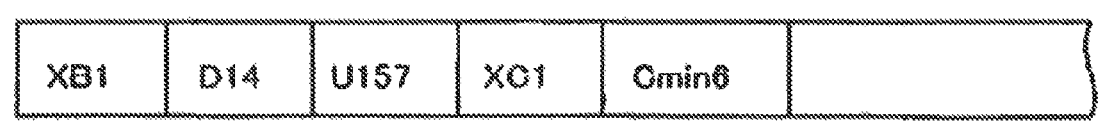

FIG. 5 depicts one example of transaction log data generated by the transaction log processing unit (11*c*) when the master database (11*a*) of the higher-level master node (MS101) is updated by the process described above. This transaction log is a file in which at least the instructions and the contents of the transactions (the row numbers and the contents of the executed processes associated therewith) are consecutively recorded in time-series.

According to FIG. 5, logs containing pairs of the instruction numbers and the row numbers are sequentially generated subsequently to a transaction start instruction (XB1). For example, the log data are, at first, a log (D14) representing that a DELETE instruction (D1) is given to delete a row number "4", a next log (U157) representing that an UPDATE instruction (U1) is given to add a row number "7" while deleting a row number "5", and a further log (XC1) representing that a commit instruction (XC1) thereof is issued. Note that the cluster minimum value (Cmin=6) may also be added to this transaction log data. Thus, the transaction log data contains the cluster minimum value (Cmin=6), thereby enabling control of a transaction discard sequence at the intermediate-level master nodes B, C, D and E or the lower-level master nodes F and G.

Note that in the case of notifying, as mentioned above, the intermediate-level master nodes B, C, D, E and the lower-level master nodes F, G of the cluster minimum value (Cmin=6) asynchronously with the transaction log data, it is feasible to execute the process of efficiently discarding the transaction without waiting for generating and transmitting the transaction log data described above.

The communication module (11d) distributes this transaction log data to all of the lower-level master nodes (MS301 ... MS30n) from the intermediate-level master node (MS201 ... MS20n) down.

The intermediate-level and lower-level master nodes each receiving the transaction log data copy (replicate) the transaction log data to their own databases. To be specific, the lower-level master node (e.g., MS302), when the communication module (11d) receives the transaction log data illustrated in FIG. 5, starts up the transaction log processing unit 11c to replicate the transaction log data to its own master database 11a. As a result, the DELETE pointers are attached to the row numbers "4" and "5", and the new row number "7" is added. Then, if the cluster minimum value (Cmin=6) is additionally written to this transaction log data, each master node discards all the transaction during which to refer to the snapshot having the transaction minimum value (Xmin) smaller than this cluster minimum value (Cmin=6).

Thus, it follows that the databases are managed in unity at the intermediate-level and lower-level master nodes by the replications based on the transaction log data transmitted from the higher-level master node.

The present invention has been discussed based on the embodiment but is not limited to this embodiment. Modified examples thereof will hereinafter be described.

(Case of Updating Database in Higher-Level Master Node MS101)

As for the process in the case of issuing the instruction to update the master database in the lower-level master node (e.g., MS301), as described in FIG. 2, the write set including the heap tuple map (HTM, the heap file) and the shadow copy (SC) is generated on the backend memory (BEM), however, there is no necessity for giving the notification to the higher-level node in the case of issuing the instruction to update the master database in the higher-level master node (MS101), and hence the write set is not generated. That is, in such a case, in the higher-level node (MS101), the update data are written directly to the master database (11a) as illustrated in the left part of FIG. 4, and the transaction log data depicted in FIG. 5 are generated. The transaction log data are distributed to the lower-level master nodes, and the lower-level master nodes each receiving the transaction log data replicate the transaction log data to their own master databases.

(When Search Process is Executed at Stage of Generating Write Set in Lower-Level Master Node)

In the lower-level master node (e.g., MS301), at the stage of generating the write set as illustrated in FIG. 3, when executing a search through the master database of the lower-level master node, there is no problem if searching for the target row numbers other than the row number with the write set being generated, however, in the case of searching for the rows (which are herein the row number "4" and the row number "5"), the substantial update process has already been executed for these row numbers, and therefore any precise search results cannot be acquired even when searching for these rows in the master database.

In such a case, the database processing unit (11b) refers at first to the heap tuple map (HTM) and thus checks whether the relevant row numbers are entered or not. For instance, in the example depicted in FIG. 3, if the search target row number is "3", the database processing unit (11b) checks whether this row (the row number "3") is entered or not by referring to the heap tuple map (HTM) in the write set on the backend memory (BEM) built up on the memory (MM). In the example of FIG. 3, this row is not entered. In this case, the database processing unit (11b) searches for this row (the row number "3") by directly accessing the master database 11a.

On the other hand, in the example illustrated in FIG. 3, if the search target row number is "4", it follows that the database processing unit (11b) detects that this row (the row number "4") is entered when referring to the heap tuple map (HTM) in the write set. In this instance, even when accessing the master database 11a, the update instruction to delete already the remaining relevant rows is executed, so that it is meaningless to set these remaining rows as the search target rows. In this case, the database processing unit (11b) refers to the heap tuple map (HTM) and thus detects that this row (the row number "4") is deleted. In this way, the search target row is deleted, and hence the database processing unit (11b) does not set this row as the search target row.

On the other hand, in the example depicted in FIG. 3, if the search target row number is "5", in the same way as described above, the database processing unit (11b) detects that the shadow copy (SC1) associated with this row (the row number "5") is generated in a way that refers to the heap tuple map (HTM).

At this time, the database processing unit (11b) may set the content into which (the content of) the row number "5" is rewritten as the search target by referring to the shadow copy (SC1). The description made above has dealt with the case of referring to the heap tuple map (HTM) per row, however, without being limited to the processing method such as this, the database processing unit (11b) at first, on the occasion of making the search, refers to heap tuple map (HTM) batchwise, then searches the master database (11a) exclusive of all the row numbers entered herein on the assumption that all these row numbers are to be deleted, and may thereafter set the shadow copy (SC1) as the search target in a manner that excludes the relevant row (in the case of the row number "4") from the search target on the basis of the entries thereof by referring again to the heap tuple map (HTM).

(Case of Conflict being Caused when Lower-Level Master Node Performs Updating Based on Transaction Log Data Given from Higher-Level Master Node)

When replicating the transaction log data distributed from the higher-level master node to the database of the lower-level master node and if the instruction to update the database of the lower-level master node is executed with respect to the relevant row, it follows that a conflict is caused.

Specifically, this case is applied to when the transaction log data related to the row number "5" is distributed from the higher-level master node at the time when updating the row numbers "4" and "5" based on the update instruction for the lower-level master node.

In such an instance, even when the write set generated at the lower-level master node is transmitted to the higher-level master node, the higher-level master node has already received the distribution of the transaction log data related to this row, and it therefore follows that the write set is aborted because of the conflict being detected in the higher-level master node. Accordingly, any inconvenience may not be caused by ignoring the conflict in the lower-level master node. This method has such an advantage that even the write set, which will be, it is known, originally aborted in the higher-level master node, is to be transmitted to the higher-level master node, and, though there are increased the respective loads on the higher-level master node and the lower-level master node, the processing can be speeded up because the conflicts may not be checked one by one at the stage where the lower-level master node replicates the transaction log data sent from the higher-level master node.

On the other hand, another method of obviating such a conflict in the lower-level master node is that when the lower-level master node generates the heap tuple map (HTM), this heap tuple map (HTM) is registered on the memory in the lower-level master node, and this memory configured as a shared memory is set in an accessible status from other lower-level master nodes. The accesses from between these other lower-level master nodes are made by the database processing units (11b) of the individual lower-level master nodes. According to this method, the conflict is checked when generating the heap tuple map (HTM), and therefore, though there is a possibility of delaying the replication of the transaction log data, the conflict problem is solved only between the lower-level master nodes, with the result that any load is not imposed on the higher-level master node.

The present invention has been discussed so far based on the embodiment but is not limited to the embodiment. For example, the description has been made by taking the example of generating the write set in the lower-level master node (e.g., MS301), however, as a matter of course, the write set may also be generated in the intermediate-level master node (MS201).

INDUSTRIAL APPLICABILITY

The present invention can be applied to the database management system taking the multi-master node configuration based on the hierarchical structure.

According to the embodiment, in the multi-master node model database also, the complete erase (VACUUM) of the whole tree can be realized at a much larger minimum ID level without losing the consistency among the databases throughout.

The invention claimed is:

1. A method of managing a recordable database including hierarchically higher-level and lower-level master nodes in which records can be updated by deleting a record of an original row number and writing a record of a new row number, the method comprising:
retaining a plurality of snapshots indicating execution statuses of the transactions in time-series at each of plural points of time, each of said snapshots including a transaction minimum value which is a minimum value of transaction ID of the implementation-underway transaction;
transmitting, in a session of any one of the lower-level master nodes, a write set containing
a shadow copy of a database of a lower-level master node, the shadow copy including a copy of a record specified by a row number that should undergo rewriting with reference to the database of the lower-level master node,
a heap tuple map, having registration of the original row number and the new row number in the way of being associated with each other, deployed on a memory of the lower-level master node itself and
the transaction minimum value of one of the snapshots to which is referred by an implementation-underway transaction to a higher-level master node;
comparing a transaction minimum value in the write set received from the lower-level master node with a numeric value which is set by the higher-level master node for erasing a tuple, retained by the higher-level master node, comparing a heap tuple map in the write set with a database of the higher-level master node itself if the transaction minimum value is equal to or larger than the numeric value, verifying whether the database of the higher-level master node containing a tuple registered in the heap tuple map is updated or not, aborting the write set when updated, updating the database of the higher-level master node by use of the shadow copy when not updated, and generating this update record as a transaction log in the higher-level master node;
aborting the write set if the transaction minimum value is smaller than the numeric value;
distributing the transaction log to the lower-level master nodes including the lower-level master node as the sender;
updating the database of the lower-level master node itself on the basis of the received transaction log in the lower-level master node; and
notifying the lower-level master nodes of the numeric value retained by the higher-level master node and discarding the transaction having the transaction minimum value smaller than the numeric value.

2. The method of managing the recordable database according to claim 1, wherein the lower-level master node compares the transaction minimum values with each other between a plurality of snapshots in which the implementation-underway transactions are recorded in time-series, sets the smallest value as a node minimum value, and notifies the higher-level master node of this node minimum value as a tree minimum value, and
the higher-level master node selectively determines and retains the numeric value from the node minimum value of the higher-level master node itself and the tree minimum values of which one or two or more lower-level master nodes notified.

3. The method of managing the recordable database according to claim 1, wherein an intermediate-level master node is provided at a hierarchy between the higher-level master node and the lower-level master node,
the lower-level master node compares the transaction minimum values with each other between the plurality of snapshots in which the implementation-underway transactions are recorded in time-series, sets the smallest value as the node minimum value, and notifies the intermediate-level master node of this node minimum value as a tree minimum value,
the intermediate-level master node compares its own node minimum value with the tree minimum values of which one or two or more lower-level master nodes notified, and notifies the higher-level master node of the smallest value as the tree minimum value of the intermediate-level master node, and the higher-level master node selectively determines and retains the numeric value from the node minimum value of the higher-level master node itself and the tree minimum values of which one or two or more intermediate-level master nodes notified.

4. The method of managing the recordable database according to claim 3, wherein the intermediate-level master node further has a tree structure of 2 or more hierarchies.

5. The method of managing the recordable database according to claim 1, wherein the lower-level master node is notified of the numeric value retained by the higher-level master node asynchronously with notifying the lower-level master node of the transaction log.

6. The method of managing the recordable database according to claim 1, wherein the lower-level master node is notified of the numeric value retained by the higher-level master node in such a way that the transaction log contains the numeric value.

7. The method of managing the recordable database according to claim 3, wherein the write set is generated in the intermediate-level master node in place of the lower-level master node, and
at least the transaction minimum value of the snapshot to which to make reference in an implementation-underway transaction in the intermediate-level master node is written to the write set.

8. A recordable database system comprising:
higher-level and lower-level master nodes in which records can be updated by deleting a record of an original row number and writing a record of a new row number, wherein each of the master nodes retains a plurality of snapshots indicating execution statuses of the transactions in time-series at each of plural points of time, each of said snapshots including a transaction minimum value which is a minimum value of transaction ID of the implementation-underway transaction;
any one of the lower-level master nodes transmits, in a session of any one of the lower-level master nodes, a write set containing
a shadow copy of a database of a lower-level master node, the shadow copy including a copy of a record specified by a row number that should undergo rewriting with reference to the database of the lower-level master node,
a heap tuple map, having registration of the original row number and the new row number in the way of being associated with each other, deployed on a memory of the lower-level master node itself and
the transaction minimum value of one of the snapshots to which is referred by an implementation-underway transaction to a higher-level master node,
the higher-level master node compares a transaction minimum value in the write set received from the lower-level master node with a numeric value which is set by the higher-level master node for erasing a tuple, retained by the higher-level master node, compares a heap tuple map in the write set with a database of the higher-level master node itself if the transaction minimum value is equal to or larger than the numeric value, verifies whether the database of the higher-level master node containing a tuple registered in the heap tuple map is updated or not, aborts the write set when updated, updates the database of the higher-level master node by use of the shadow copy when not updated, and generates this update record as a transaction log,
the write set is aborted if the transaction minimum value is smaller than the numeric value,
the transaction log is distributed to the lower-level master nodes including the lower-level master node as the sender,
the lower-level master node updates its own database on the basis of the received transaction log, and
the transaction having the transaction minimum value smaller than the numeric value is discarded when notified of the numeric value retained by the higher-level master node.

9. A non-transitory recording medium to record a program for making a recordable database system including hierarchically higher-level and lower-level master nodes in which records can be updated by deleting a record of an original row number and writing a record of a new row number, execute:
retaining a plurality of snapshots indicating execution statuses of the transactions in time-series at each of plural points of time, each of said snapshots including a transaction minimum value which is a minimum value of transaction ID of the implementation-underway transaction;
transmitting, in a session of any one of the lower-level master nodes, a write set containing
a shadow copy of a database of a lower-level master node, the shadow copy including a copy of a record specified by a row number that should undergo rewriting with reference to the database of the lower-level master node,
a heap tuple map, having registration of the original row number and the new row number in the way of being associated with each other, deployed on a memory of the lower-level master node itself and
the transaction minimum value of one of the snapshots to which is referred by an implementation-underway transaction to a higher-level master node;
comparing a transaction minimum value in the write set received from the lower-level master node with a numeric value which is set by the higher-level master node for erasing a tuple, retained by the higher-level master node, comparing a heap tuple map in the write set with a database of the higher-level master node itself if the transaction minimum value is equal to or larger than the numeric value, verifying whether the database of the higher-level master node containing a tuple registered in the heap tuple map is updated or not, aborting the write set when updated, updating the database of the higher-level master node by use of the shadow copy when not updated, and generating this update record as a transaction log in the higher-level master node;
aborting the write set if the transaction minimum value is smaller than the numeric value;
distributing the transaction log to the lower-level master nodes including the lower-level master node as the sender;
updating the database of the lower-level master node itself on the basis of the received transaction log in the lower-level master node; and
notifying the lower-level master nodes of the numeric value retained by the higher-level master node and discarding the transaction having the transaction minimum value smaller than the numeric value.

* * * * *